(No Model.)
C. SCHIFFERLY.
BAKE PAN.
No. 448,548.          Patented Mar. 17, 1891.
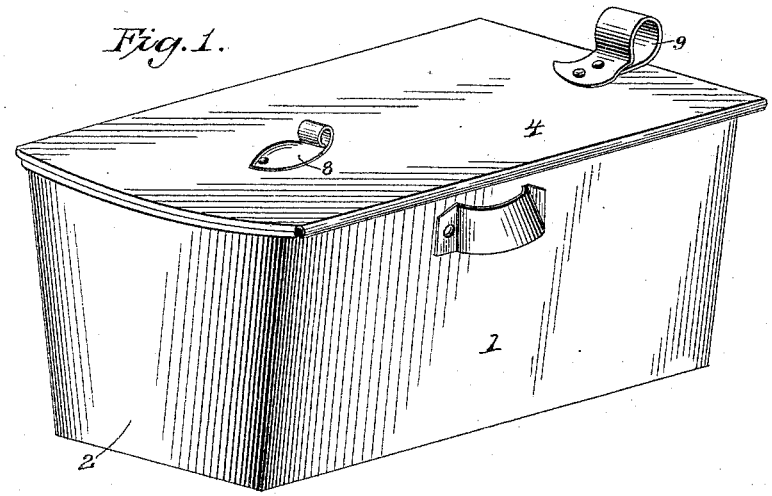
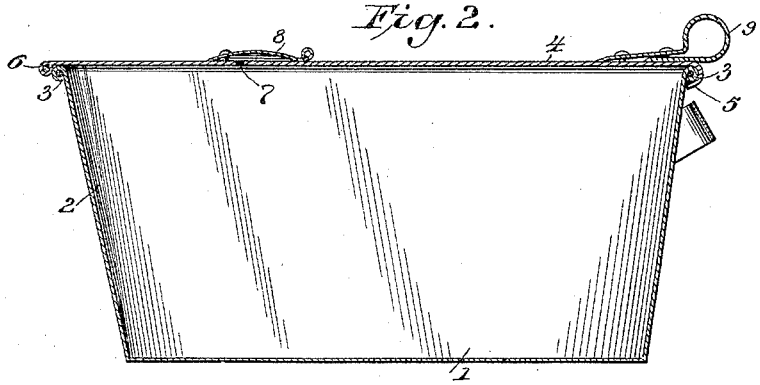
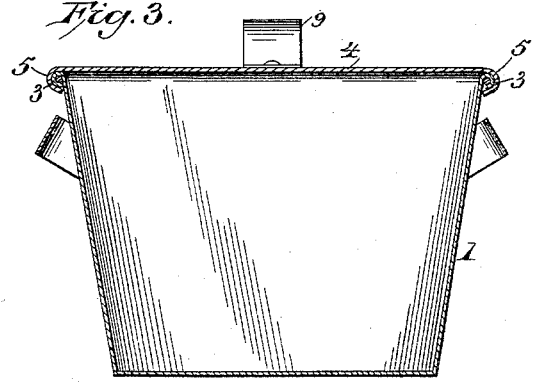
Witnesses:
Inventor
Conrad Schifferly
By his Attorneys,

UNITED STATES PATENT OFFICE.

CONRAD SCHIFFERLY, OF FORT WAYNE, INDIANA.

BAKE-PAN.

SPECIFICATION forming part of Letters Patent No. 448,548, dated March 17, 1891.

Application filed October 28, 1890. Serial No. 369,602. (No model.)

*To all whom it may concern:*

Be it known that I, CONRAD SCHIFFERLY, a citizen of the United States, residing at Fort Wayne, in the county of Allen and State of Indiana, have invented a new and useful Bake-Pan, of which the following is a specification.

This invention has relation to improvements in bake-pans, the object in view being to provide a bake-pan adapted to brown the article being baked, and also provide the said pan with a suitable sliding cover adapted to form a tight joint in connection with the upper beaded edge of the pan, and so constructed as while forming such tight joint yet to be capable of being easily withdrawn and applied.

Various other objects and advantages will hereinafter appear, and the novel features thereof will be particularly pointed out in the claim.

Referring to the drawings, Figure 1 is a perspective of a bake-pan constructed in accordance with my invention. Fig. 2 is a vertical longitudinal sectional view. Fig. 3 is a transverse section of the same.

Like numerals indicate like parts in all the figures of the drawings.

1 designates the pan, which is of the usual rectangular shape, with the exception that one end is slightly outwardly curved or rounded, as at 2, throughout its length. The four edges of the walls of the pan are beaded, as at 3, as is usual.

4 designates a flat cover agreeing in contour with the pan, and having its opposite side edges and at its front edge downwardly and inwardly bent, as at 5, to embrace the opposite side beads and the front end bead of the pan, and to slide upon the former. The rear end of the cover is beaded, as at 6, so as to be sprung over the rear beaded end of the pan and combined with the same to form a snug joint. Near its rear end the cover is perforated, as at 7, and at one side is pivoted a plate 8 for covering said perforations, the plate also being adapted to be swung to one side from over said perforations. By inserting the finger in the finger-hole 9, secured to the front edge of the cover, the same may be withdrawn longitudinally from the pan and the article to be cooked placed in the pan, after which the cover is closed and the process of baking proceeded with in the usual manner. After the article has been cooked sufficiently, in order to give the same the desired browning the pivoted plate is swung over the perforation and the heat and steam retained in the pan, so that the exterior of the article being cooked is browned. By reason of the rear end of the pan being curved it will be apparent that the usual inward sagging or permanent bending of the end of the pan is avoided, as said end is stiffened against such bending, and after having been bent for the purpose and during the act of springing on the cover it will immediately resume its position, and thus securely lock the cover in place. In this manner the efficiency of the joint at the end of the pan is not impaired, as otherwise would be the case, and the pan is greatly improved as to durability.

Having described my invention, what I claim is—

The combination, with an oblong bake-pan, the rear end of which is outwardly bowed or curved throughout its length and adapted to be temporarily sprung inwardly, and the four edges of which are beaded, of a cover agreeing in size with the pan, having its opposite sides and front end provided with curved guides for embracing the side and front beads of the pan and at its rear end provided with a bead for springing over the rear end of the pan and curved to agree therewith, substantially as specified.

In testimony that I claim the foregoing as my own I have hereto affixed my signature in presence of two witnesses.

CONRAD SCHIFFERLY.

Witnesses:
JAMES E. GRAHAM,
FRED V. GRAHAM.